United States Patent [19]

Ferraro et al.

[11] Patent Number: 4,744,909
[45] Date of Patent: May 17, 1988

[54] METHOD OF EFFECTING ACCELERATED OXIDATION REACTION

[75] Inventors: Francis M. Ferraro, Westminster, Colo.; Ronald H. Hall, Oakville, Canada

[73] Assignee: VerTech Treatment Systems, Inc., Denver, Colo.

[21] Appl. No.: 10,060

[22] Filed: Feb. 2, 1987

[51] Int. Cl.⁴ .............................................. C02F 1/74
[52] U.S. Cl. ..................... 210/747; 210/752; 210/761
[58] Field of Search ............... 210/747, 752, 758, 761, 210/762, 721, 170, 910

[56] References Cited

U.S. PATENT DOCUMENTS

| | | | |
|---|---|---|---|
| 3,606,999 | 9/1971 | Lawless | 210/761 X |
| 4,369,115 | 1/1983 | Bauer | 210/761 |
| 4,384,959 | 5/1983 | Bauer et al. | 210/739 |
| 4,395,339 | 7/1983 | Chowdhury et al. | 210/761 |
| 4,564,458 | 1/1986 | Barleson | 210/747 |
| 4,670,162 | 6/1987 | Robey | 210/761 |

*Primary Examiner*—Tom Wyse
*Attorney, Agent, or Firm*—Cullen, Sloman, Cantor, Grauer, Scott & Rutherford

[57] ABSTRACT

The method of this invention is particularly, although not exclusively, adapted for effecting accelerated oxidation reactions in a downhole or deep well wet oxidation apparatus, including the processing of aqueous organic waste, such as municipal sludge. It includes injecting a multiple-phase composition which contains an oxygen or an oxygen-rich gas which is fully saturated with water vapor and which also contains water in the liquid phase into a wet oxidation reaction apparatus which contains an aqueous stream of combustible waste, preferably at the temperature and pressure of the waste stream at the point of injection. This reduces the likelihood of hazardous spontaneous combustion which may otherwise occur if dry spots are allowed to form in the reaction apparatus. The volume of water in the composition should be equal to at least twice the volume of water necessary to saturate the gas with water vapor to maintain at least 50 percent of the water in the liquid phase.

24 Claims, 1 Drawing Sheet

METHOD OF EFFECTING ACCELERATED OXIDATION REACTION

FIELD AND BACKGROUND OF THE INVENTION

The present invention relates to improvements in the treatment of waste and other combustible materials in an aqueous fluid stream, such as organic solvents, municipal sludge, toxic or contaminated products and the like.

Various wet oxidation treatment processes are disclosed in the prior art. In general, the temperature of combustible material dissolved and/or suspended in water in the presence of oxygen is increased to produce a wet oxidation reaction. The combustion reaction is exothermic and can be carried out in a reaction apparatus having a continuous heat exchanger such that the heat evolved by the combustion reaction is used to heat an influent waste stream to the desired temperature. This provides an enhanced, energy-efficient system.

The prior art has also proposed utilizing wet oxidation processes of this type in a continuous vertical heat exchange column which may be supported in a subterranean well. The depth of the well or column determines in part the hydrostatic fluid pressure which is maintained such that boiling of the fluid during the reaction process is prevented. Thus, the prior art has recognized the possibility of treating organic waste, including municipal sludge, in a deep well reaction vessel having tubes nested to form annuli in a heat exchange relation wherein combustible waste is introduced as an aqueous influent waste stream. The combustible waste in the fluid medium is one reactant and oxygen, introduced as a gas, such as air, is the other reactant. The air is injected under pressure into the downgoing influent tube in a manner to promote intense mixing and contacting and to increase the flow of reactants and products through the system. The quantity of gas injected into the influent annulus is controlled to provide the proper oxygen-to-waste ratio to bring about the desired reaction, as more fully disclosed in U.S. Pat. No. 4,272,383 to McGrew, which is assigned to the assignee of the instant application. The disclosure of the foregoing McGrew patent is incorporated herein by reference.

The influent waste or waste stream is pumped from the ground surface downwardly into the influent annulus at a controlled temperature, pressure and flow rate. The fluid waste forms a hydrostatic column having the desired pressure and temperature at a reaction zone deep within the reaction vessel. Under these conditions, the reactants react at an accelerated rate. The heated fluid and reaction products are then flowed upwardly through the effluent annulus to ground surface. As described, the influent and effluent annuli are preferably in heat exchange relation to best utilize the reaction heat. The temperature of the fluid in the reaction zone is controlled, preferably by adding or removing heat from the system. This can be achieved by placing a vertical heat exchange apparatus in the reactor assembly as shown in the disclosed preferred embodiment.

As will be understood by those skilled in the art, the overall efficiency of a downhole or deep well reactor apparatus of the general type described may be improved by using pure oxygen or oxygen-rich gas for injection rather than air because air contains only about 21 percent by volume oxygen. By increasing the amount of oxygen available to react with the combustible waste, the wet oxidation reaction enhanced. Thus, the prior art does in fact suggest the injection of oxygen-enriched air or even pure oxygen into an oxidation reaction vessel (see for example U.S. Pat. No. 3,449,247 to Bauer). The injection of substantially pure oxygen, oxygen-enriched air or other oxygen-enriched gas into the influent annulus can, however, cause an unwanted and potentially hazardous form of combustion resulting from dry spots produced in the reactor. That is, the injection of dry oxygen-enriched gases into the reactor may create dry areas of combustible material which can ignite in the dry, oxygen-rich environment. Also, when exposed to a dry, oxygen-rich gas, the tube wall itself may actually ignite. This series of events can cause catastrophic failure of the reactor.

The aforementioned Bauer patent also discloses the injection of a gas reactant at either the top or the bottom of the reactor well. Since a column of "pure" liquid has greater density and thus weighs more than the same liquid containing a gas, lowering the point of injection of the reactant gas in the influent annulus increases the fluid pumping efficiency. Unfortunately, the energy saved in lowering the point of injection of the reactant gas may be substantially offset by that required to pressurize the reactant gas to the pressure of the influent fluid at this low point of injection. The prior art does not suggest any improvement in the efficiency of the wet oxidation process resulting from lowering the point of injection of the reactant gas.

The method of the present invention provides a safe and efficient manner of introducing oxygen, oxygen-enriched air or an oxygen-rich gas directly into the influent waste stream in the reaction apparatus. In one embodiment, a composition containing substantilly pure gaseous oxygen or oxygen-rich gas as one component is injected into the influent annulus at multiple sites, including at least one injection point near the reaction zone.

SUMMARY OF THE INVENTION

In accordance with the present invention, a method is provided for introducing oxygen, oxygen-enriched air or an oxygen-rich gas into an influent combustible waste stream in a wet oxidation reaction apparatus which prevents the formation of dry spots. The method includes flowing a fluid stream containing combustible waste through the influent annulus or passage of a reaction apparatus, elevating the temperature and pressure of the influent waste stream, and injecting a multiple-phase composition which contains gaseous oxygen, or an oxygen-rich gas, which is fully saturated with the water vapor, and which also contains liquid water. By saturating the injected gas with water vapor and also providing at least some water in the liquid phase, water which is present in the liquid waste is prevented from evaporating into the injected gas, a process which otherwise may form dry spots. In one embodiment, the quantity of liquid water so injected is great enough to always maintain at least some liquid phase during fluctuations in temperature and pressure in the reaction vessel which affect vaporization. In one preferred embodiment, the multiple-phase composition comprises pure oxygen or oxygen-rich gas which is fully saturated with water vapor and which also includes a liquid water phase, the liquid water phase being present in an amount which is equal to the amount of water present in the vapor phase. In other words, the quantity of water added to the gas is great enough such that 50 percent by volume of the water is present in liquid phase and 50 percent is present in the vapor phase at injection temperature and pressure. The method thus contemplates preparing a multiple-phase composition of an oxygen-rich gas which is fully saturated with water vapor and which also contains liquid water and injecting this multiple-phase composition into the liquid waste stream in the wet oxidation reaction apparatus. In a particularly preferred method of this invention, the stream of gas and liquid water is injected into the fluid stream of combustible material at multiple locations along the influent reactor annulus or passage.

In the most preferred method of the invention, the process is carried out in a vertical well wet oxidation reaction apparatus having a plurality of tubes which extend generally vertically to a selected depth below the earth's surface. Thus, the preferred method comprises flowing a fluid waste stream containing a combustible waste down an influent annulus or passage to form a hydrostatic column of substantial fluid pressure. The temperature of the fluid is increased sufficiently to support a wet oxidation reaction. As described above, the improved method includes injecting a concurrent stream of pure oxygen, or an oxygen-rich gas, and liquid water into the influent passage at the pressure of the waste fluid in the influent passage at the point of injection whereby the oxygen reactant is safely introduced into the reaction apparatus by eliminating the formation of dry spots. As described, the total volume of water in the oxygen stream must be greater than the volume necessary to fully saturate the gas at the injection temperature and pressure, i.e. the equilibrium vapor pressure, and still maintain a quantity of water in the liquid phase. Finally, the oxidation reaction products and water are returned to the ground surface through an effluent annulus or passage communicating with the influent passage, preferably in heat transfer relation.

The method of effecting an accelerated oxidation reaction of this invention is preferably utilized to treat a mixture of suspended and dissolved organic material in an aqueous waste stream such as municipal sludge. As described more fully in the above-referenced patent to McGrew, the municipal sludge is preferably diluted with water prior to its introduction in the deep well reaction apparatus. As an example, the reaction temperature at which the oxidation reaction is self-sustaining in the McGrew apparatus is approximately 500° F., and approximately a 70 percent COD (chemical oxygen demand) reduction of the organic waste material is achieved. In a modification of the present invention, the introduction of pure gaseous oxygen or substantially pure gaseous oxygen into the influent waste in the reaction apparatus near ground level by pulse injection results in substantial agitation of the organic-laden influent. This reduces organic growth and fouling of the influent passage and, accordingly, reduces the pumping pressure required to move material through the reaction apparatus. The pressure of the oxygen or oxygen-rich gas supplied to the waste in the present invention is approximately 2000 pounds per square inch, which is approximately the hydrostatic column in the influent tube at about 3000–4000 feet below ground level. Thus, the oxygen and liquid water combination of the present invention may be introduced into the downwardly flowing fluid in the influent tube at approximately as far down as 3000–4000 feet below ground level without requiring any additional pressurization. Also, the multiple-phase composition supply line is disposed through the inlet of the influent annulus which maintains the temperature of the oxygen and liquid water at substantially the temperature of the influent fluid, thus equaling both the pressure and temperature of the influent fluid at the point of injection in the reactor.

In the most preferred embodiment, the present invention provides a method for initiating an accelerated wet oxidation reaction in a aqueous fluid stream of combustible waste inside a reaction apparatus wherein the lines or pipes through which the multiple-phase composition is delivered to the waste are "purged" of unwanted combustible impurities and by which the multiple-phase composition can be formed and injected without producing a flow of dry oxygen or dry oxygen-rich gas through a substantial portion of the waste treatment apparatus. Similarly, a method to shut down the system is provided by which the flow of dry oxygen or dry oxygen-rich gas is avoided through any substantial portion of the system. During start-up, the flow of diluted influent waste as an influent waste stream is commenced. Next, an inert gas is continuously flowed through the supply lines and into the suspended fluid waste inside the reactor. A stream of liquid water is introduced into the supply line such that both water and the inert gas flow through the lines together into the waste in the reactor. A detergent solution is then flowed through the lines along with the inert gas to remove debris from the supply lines. It is preferred that an aqueous detergent solution be used for this purpose. The cleaned lines are then rinsed by flowing liquid water without the detergent solution through the lines. Next, and while the inert gas and water are being continuously flowed through the lines, oxygen or an oxygen-rich gas is introduced into and flowed through the supply lines. Thus, in this embodiment, oxygen or oxygen-rich gas, inert gas, and liquid water are contemporaneously flowed through the supply lines and into the waste inside the reaction apparatus. Finally, the flow of inert gas is stopped and the flow of oxygen and water or oxygen-rich gas and water is regulated to form the multiple-phase composition used in the present invention which is injected into the waste stream in the reaction apparatus.

To shut down the system, a method is provided whereby the flow of influent waste is first stopped and the effluent stream, from which the ash endproduct is substantially removed, is recycled through the reaction apparatus. Alternatively, the flow of influent waste is stopped and water is circulated through the reaction apparatus. Next, an inert gas is flowed through the gas supply lines along with the multiple-phase composition, again diluting the concentration of oxygen. Next, the flow of oxygen or oxygen-rich gas is stopped, leaving only water and inert gas flowing through the lines. The water and inert gas are then discontinued in any order.

The method of the present invention for producing the accelerated oxidation reaction of a combustible material therefore permits the injection of pure oxygen or oxygen-rich gas into the waste stream in the reaction apparatus and avoids the aforementioned safety hazards associated with introduction of dry oxygen into a combustion system. Further, the oxygen and water composition is injected into the aqueous influent waste stream in the reaction apparatus at predetermined locations to control the oxidation reaction as desired. The method of this invention further eliminates the requirement of a continuous supply of inert gas, reducing cost and increasing reaction vessel capacity by increasing volume availability for oxygen. Other advantages and meritorious features will be more fully understood from the following detailed description of the preferred embodiments, the appended claims and the drawing.

DESCRIPTION OF THE PREFERRED EMBODIMENTS

Figure 1:
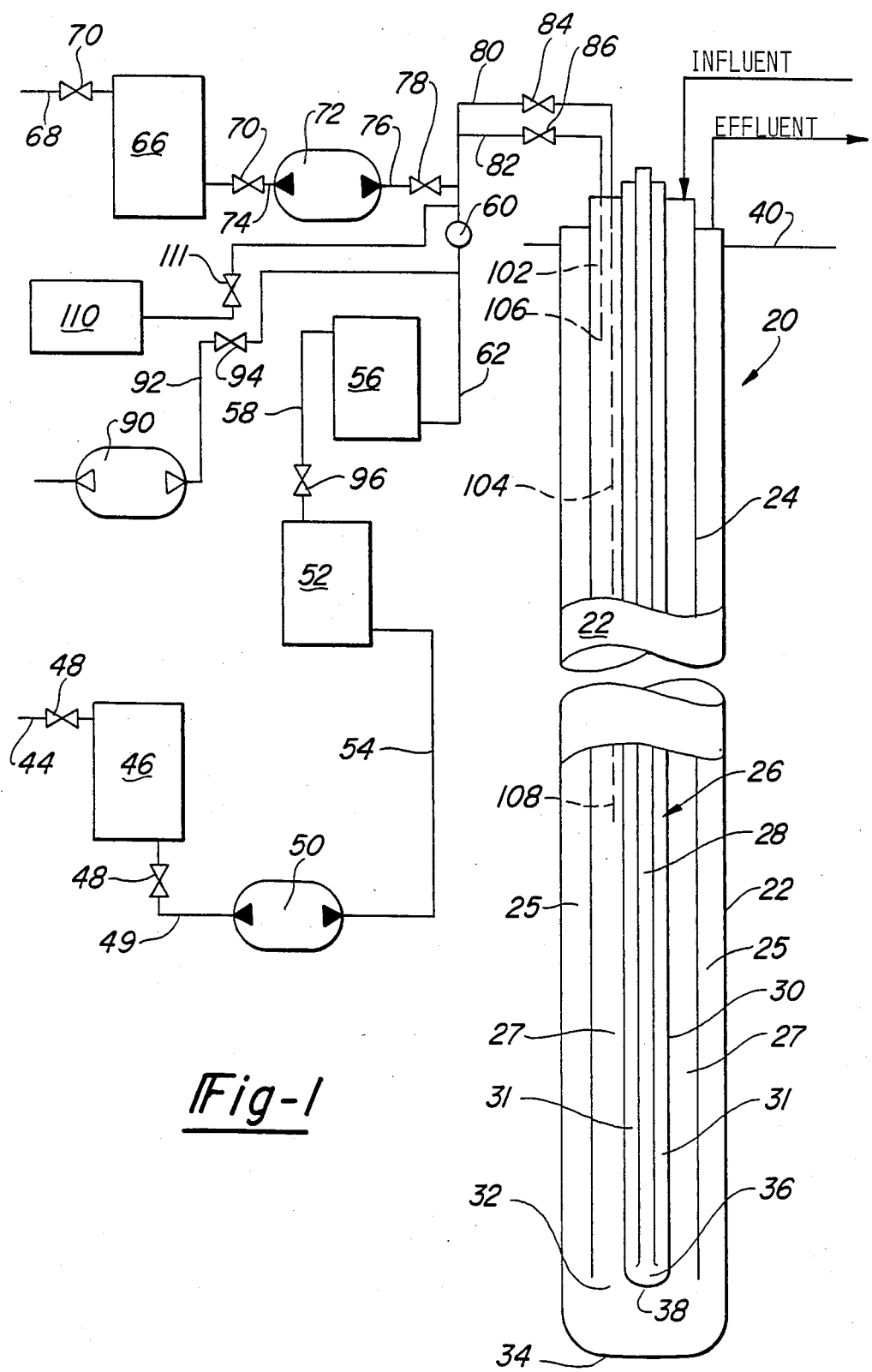
FIG. 1 is a schematic illustration of an embodiment of an apparatus which may be used in the method of effecting accelerated oxidation reaction of this invention.

The continuous fluid treatment apparatus 20 illustrated in FIG. 1 is a vertical downhole or deep well fluid reaction apparatus suitable for wet oxidation treatment of various combustible materials in an aqueous fluid stream, including suspended and/or dissolved organic waste, such as diluted municipal sludge. As disclosed in the above-referenced McGrew patent, the preferred fluid treatment apparatus comprises a plurality of generally concentric, nested pipes or tubes which extend vertically below ground level. In a treatment apparatus for the wet oxidation of, for example, municipal waste, the tubes may extend approximately one mile into the ground to define annuli which, when filled with a fluid waste stream, create a hydrostatic column of very substantial fluid pressure. It will be understood, however, that the length of the tubes will vary depending upon the type of material being treated and the desired reaction. It may also be suitable to utilize the reaction apparatus and method of this invention for a variety of reactions of the type in which solid particulate matter is suspended and/or dissolved in a circulating fluid. It should also be pointed out that the aforementioned tubes are generally not of unitary construction. Each tube typically comprises a plurality of sections which are interconnected in serial alignment in a string, similar to the pipes in an oil well. In a typical municipal sludge wet oxidation application, the length of each pipe is about 40 feet long and the total length is about 5,200 feet. The flow rate through the reactor of the fluid being treated typically ranges from about 80 to about 400 gallons per minute in substantially continuous operation.

In the disclosed preferred embodiment of reaction apparatus 20, the exterior or outermost tube 22 surrounds tube 24 to define upcomer passage or annulus 25. Tube 24 surrounds a heat exchanger 26 to define downcomer passage or annulus 27. As described in the above-referenced McGrew patent, heat exchanger 26 is utilized to control the temperature of the reaction vessel, whereby heat may be added or removed. The disclosed embodiment of heat exchanger 26 includes downcomer pipe 28, which is surrounded by upcomer pipe 30 to define annulus 31. Oil, water, steam or other heat exchange medium is circulated through heat exchanger 26 to heat or cool the reaction vessel when required.

The aqueous waste which contains combustible material is introduced into downcomer annulus 27 as an influent waste stream and flows downwardly through annulus 27 which is in contact with heat exchanger 26. In municipal sludge wet oxidation reaction apparatus 20, a wet oxidation reaction typically begins at about 1000-2000 feet below ground surface at a fluid waste stream temperature of about 350° F. The reaction proceeds slowly as the fluid waste stream continues to flow downwardly and the temperature of the fluid waste stream increases to about 500° F. at approximately 3000 to 5000 feet below ground level. The exothermic wet oxidation reaction is then quite vigorous, establishing a "reaction zone"F, in downcomer annulus 27, and considerable heat is generated. Bottom 32 of tube 24 is open so that the reaction products and water flow from downcomer annulus 27 to upcomer annulus 25. The heated fluid which contains the reaction products is then flowed upwardly through upcomer annulus 25 as an effluent waste stream. By virtue of the heat exchange relationship of the apparatus, the heat of the upcoming effluent is transferred to the downcoming influent. Similarly, downcomer pipe 28 of heat exchanger 26 is provided with open end 36 and upcomer pipe 30 has closed end 38. The heat transfer fluid, such as oil, is received through downcomer pipe 28 and flows back up through annulus 31, thereby recirculating the heat transfer fluid. Typically, heated oil is suppliedto downcomer pipe 28, which is preferably an insulated tubular. The heated oil then flows downwardly through the insulated tubular until it reaches open end 36, concentrating the heat transferred to the circulating fluid being treated in the reaction zone at the lower end of the apparatus.

FIG. 1 also illustrates schematically the preferred method of injecting the oxygen reactant safely into the reaction apparatus. As used herein, the terms "oxygen-rich" or "oxygen-enriched" gas mean any gas which includes oxygen in a concentration greater than the concentration of oxygen in air and includes pure oxygen, oxygen-enriched air, and oxygen plus inert or active constituents depending upon the exact nature of the reaction to be carried out. For use in the present invention, it is preferred that the oxygen-rich gas contain at least 90 percent oxygen by volume. In some applications, it may be possible to practice the present invention with other gases or gas mixtures. As will be appreciated by those skilled in the art, dry, oxygen-rich gas or dry pure oxygenin the presence of a dry combustible material is relatively hazardous since it may ignite violently as is known. As described above, the use of dry, oxygen-rich gas in a wet oxidation reaction apparatus can result in "hot spot" ignition of the combustible material if the combustible material is allowed to dry, causing damage to the apparatus. When dry oxygen-rich gas is injected using conventional methods, the gas may dry an area of the wall resulting in ignition of dry combustible material such as scale, particularly where the oxygen-rich gas is injected below ground surface level where, as explained, the fluid is heated and thus tends to evaporate more rapidly. The ignition of the dry organic matter in the presence of oxygen may ignite the reactor materials, resulting in serious damage and destruction of the tube. With certain metal alloys used to construct some tube-type reactors, regions of metal may even ignite. In view of the fact that the reactor tubes may extend a mile deep, damage of this type can be extremely costly, requiring shutdown of the entire waste treatment apparatus fora minimum of several days. Thus, safe and efficient means of injecting the oxygen reactant into the system which minimizes hazards is an important objective of this invention.

The apparatus shown in FIG. 1 includes an insulated storage tank for liquid oxygen 46, including supply line 44 and valves 48 at the inlet and outlet of the tank. As is known, liquid oxygen can be purchased commercially. Moreover, liquid oxygen may be stored at a pressure of about 50 pounds per square inch at a temperature of about −260° F. In the present invention, liquid oxygen is flowed on a demand basis through line 49 to a conventional liquid oxygen pump 50 which pressurizes the liquid oxygen to about 2000 pounds per square inch. A suitable liquid oxygen pump is a small, single stage reciprocal pump which is illustrated generically in the drawing. A pressure of about 2000 psi is an efficient pressure for transporting the liquid oxygen to the point of use. The liquid oxygen is then pumped to a liquid oxygen atmospheric vaporizer 52 through line 54. Liquid oxygen atmospheric vaporizers are heat exchangers, available commercially, which efficiently convert a gas from the liquid phase to the gaseous phase. Substantially pure oxygen in the gaseous phase, near ambient temperature, is then received in line 58. The pressure remains at about 2000 psi. The gaseous oxygen is then received and stored in a storage bottle or tank 56.

As noted, the hazards associated with injecting an oxygen-rich gas into the influent stream of the reaction apparatus is materially reduced through the present invention by injecting a concurrent stream of oxygen-rich gas and liquid water. In one embodiment of the present invention, water is stored in tank 66. The water is received through inlet 68 from a suitable source. The water flow is controlled by inlet and outlet valves 70. Water is delivered through line 74 to pump 72 to be pumped to the desired pressure. Water is pumped through line 76 into oxygen line 62 and the volume of water pumped into the oxygen line is controlled by valve 78. The volume of oxygen pumped into the line is controlled by the flow control valve 60 which includes conventional safety devices required for handling an oxygen-rich gas. As described below, the preferred method of this invention includes injecting the oxygen-rich gas and liquid water at multiple vertically-spaced locations in downcomer annulus 27 of reaction apparatus 20. FIG. 1 shows two injection lines 80 and 82, which are controlled by valves 84 and 86. It will be understood, however, that several injection lines may be utilized.

A second gas such as air, nitrogen, or other inert gas may be combined with substantially pure oxygen to create an oxygen-rich gas or gaseous mixture. The oxygen-rich gas preferably contains at least 50 percent oxygen by volume, although lesser amounts may achieve some beneficial results. The disclosed apparatus therefore may include an air compressor 90 wherein the compressed air may be delivered through line 92 to line 62. The ratio of oxygen to air may be controlled by valves 94 and 96. Water is normally utilized as a coolant and a flame retarder in the method of this invention because it is efficient, readily available, inexpensive and because water is normally utilized as the fluid carrier in wet oxidation reactions. It may be possible to use some other substance with characteristics similar to water in some applications. As described in the above-referenced McGrew patent, in the reaction of municipal sludge, the sludge is preferably diluted with water prior to delivery of the sludge to the reaction apparatus. It will be understood, however, that various constituents may be added to the water, including surfactants, cleaning or scale-inhibiting additives and reactants. It will also be understood that the oxygen used in the method of this invention may be generated at the point of use if the demand is sufficiently large. For example, a greater demand of oxygen may be met with a conventional vacuum swing adsorption air separator unit or a substantial demand may be met with a cryogenic air separation plant located at the site of the wet oxidation reaction apparatus. Thus, the preferred method of generating oxygen in the method of this invention will depend upon the volume of combustible material processed by the reaction apparatus 20. In a deep well wet oxidation reaction apparatus of the type shown in FIG. 1, which is processing less than about 10 tons of sludge per day, the use of commercially available liquid oxygen may be preferred.

The present invention thus provides a novel method of injecting oxygen or an oxygen-rich gas directly into an aqueous waste stream in a wet oxidation reaction apparatus. A multiple-phase composition which contains gaseous oxygen that is fully saturated with water vapor and which also contains water in the liquid phase is prepared and injected into the influent liquid waste stream in the downcomer annulus 27. This multiple-phase composition is to be distinguished from steam which when heated may dry out combustible material in the reaction apparatus and cause the type of unwanted combustion which the present invention eliminates. The amount of liquid phase water present in the multiple-phase composition can be adjusted within the guidelines of the present invention for a particular reaction.

In other words, in the method of this invention, the volume of water which is injected into the liquid waste along with the gaseous oxygen must be great enough so that water is at least partially present in the liquid phase. Thus, the volume of water added to the oxygen or oxygen-rich gas must be greater than the volume necessary to fully saturate the oxygen-rich gas at the injection temperature and pressure and great enough so that at least some water in the liquid phase is maintained at all times during the wet oxidation reaction. In the preferred method of this invention, the total volume of water in the multiple-composition is equal to twice the volume of water necessary to fully saturate the oxygen or oxygen-rich gas with water vapor and maintain at least 50 percent of the water in the liquid phase. That is, it is preferred that the quantity of liquid phase water be at least equal to the volume of water present as water vapor in the oxygen-rich gas at injection temperature and pressure. In the most preferred method of this invention, the total volume of water in the multiple-phase composition is about ten times the volume necessary to fully saturate the oxygen or oxygen-rich gas at injection pressure and temperature, which assures a substantial safety margin of liquid phase water. By providing a substantial excess quantity of water, the possibility of the liquid phase completely vaporizing is eliminated. Using the deep well wet oxidation reaction apparatus illustrated in the drawings for the processing of municipal sludge, the required volume of water may be calculated as follows. The pumping pressure adjacent the inlet of annulus 27 is typically about 300 psi, and the temperature of the fluid waste during start-up may be about 300° F. The vapor pressure of water at 300° F. is 67 psia. Thus, the partial pressure of oxygen will be equal to 245 psia. The volume of one pound of oxygen at these temperatures and pressures is 1.1 cubic feet and the weight of water is 0.15 pounds. Thus, for each pound per minute of oxygen injected into the influent tube, the quantity of water required to fully saturate the gaseous oxygen is 0.15 pounds per minute or 0.02 gallons per minute. In the preferred embodiment of the present invention, which provides at least twice the volume of water needed for saturation, the required volume of water is 0.04 gallons per minute for each pound per minute of oxygen injected into the system. In the most preferred embodiment 0.2 gallons per minute of water is required for each pound per minute of oxygen injected into the influent stream, which provides a safety margin of ten. The volume of oxygen injected is, of course, dependent upon the volume of combustible material received in the influent tube and the desired C.O.D. reduction.

As described above, the apparatus shown in FIG. 1 includes two oxygen-water injection lines 102 and 104 which extend downwardly through downcomer annulus 27 from adjacent the ground surface level 40. Each of the injection lines 102 and 104 are open or may include conventional nozzles at their distal ends, indicated by reference numerals 106 and 108 respectively. The volume of the multiple-phase water composition which is injected is controlled by valves 84 and 86. The injection pressure must be equal to at least the influent fluid pressure or pump pressure plus the static column pressure at the depth of the nozzle, less the friction drop of the influent fluid. The influent or pump pressure at the upper end of downcomer annulus 27 in the disclosed apparatus when processing municipal sludge is typically between about 200 and 600 psi. Thus, the injection pressure should be at least 600 pounds per square inch. By introducing the multiple-phase composition directly into the reaction apparatus, greater control over the reactive process is achieved.

In processing municipal sludge, the influent solids-laden stream has a high degree of fouling which increases the required pumping pressure. To reduce this fouling, the preferred embodiment of the present invention includes an injection nozzle 106 located in the reaction apparatus adjacent the ground surface level 40. At this position, the multiple-phase gas and water composition churns the sludge, mechanically breaking the organic growth which otherwise reduces the pumping pressure. In the most preferred method of this invention, the oxygen-water injection at the upper nozzle 106 is cycled or pulsed to avoid or prevent fouling in the top portion of downcomer annulus 27. For example, 10 percent by volume of the oxygen reactant may be supplied through upper nozzle 106 in pulses every ten seconds, with each pulse having a one second duration. The pulsing agitates the organic material, reducing fouling. As described above, the pumping pressure of the influent may be reduced while simultaneously preventing unwanted ignition by injecting a multiple-phase gas and water composition further downstream in downcomer annulus 27. As described above, the accelerated wet oxidation reaction in the disclosed embodiment of the deep well reaction apparatus processing municipal sludge begins at about 1000–2000 feet down from the ground surface 40, where the temperature may be about 350° F. In the embodiment of the apparatus shown in FIG. 1, the pressure of the oxygen and water stream is about 2000 psi. Thus, the combined oxygen-rich gas and liquid water stream may be injected into the influent tube at a depth of approximately 3000–4000 feet without additional pressurization. Thus, the preferred method of this invention includes a second oxygen-water injection 108 at a depth of about 3000–4000 feet. In the disclosed method, about 90 percent by volume of the multiple-phase composition may be injected into downcomer annulus 27 through the lower nozzle 108. As described, the apparatus may include several injection nozzles. For example, a series of vertically spaced nozzles may be provided in the influent tube as the influent approaches the reaction zone, which is generally the lower part of the downcomer passage where the oxidation reaction is most vigorous. It is thus possible to control the wet oxidation reaction by the location of the injection nozzles while accomplishing the other objectives of the invention since the wet oxidation reaction is fueled by oxygen. In certain reactions, particularly where COD reduction is not the principal object of the reaction, the nozzles may be positioned to purposely starve the wet oxidation reaction or, alternatively, to concentrate the reaction in a particular zone.

The method of effecting an accelerated wet oxidation reaction of the present invention therefore includes flowing an aqueous fluid stream of combustible materials into downcomer annulus 27, and subjecting the fluid stream to sufficient pressure and temperature to oxidize the combustible materials at an accelerated rate while injecting a concurrent stream of an oxygen-rich gas and liquid water under pressure into the fluid stream in downcomer annulus 27 through nozzles 106 and 108. In one preferred embodiment, the oxygen-water stream is injected into downcomer annulus 27 at a first site adjacent the ground surface 40 in pulses and at a second, vertically spaced location 108 which is most preferably at or near the point of initiation of the wet oxidation reaction.

As stated, injection lines are provided through which the multiple-phase composition of the present invention is delivered to an injectionsite in the downcomer annulus of the vertical waste reaction apparatus. During start-up injection lines 80, 82, 102 and 104, collectively referred to hereinafter as "injection lines", are first "purged" in the following manner, which is contemplated as being within the scope of the present invention. This start-up method ensures that no dry oxygen or dry oxygen-rich gas flows through the system alone, presenting a potential source of unwanted, rapid combustion. First, the flow of influent waste in the form of an influent waste stream is started in the downcomer annulus. That is, the fluid waste is added to the reaction apparatus as an influent stream. An inert gas is then introduced into the injection lines and flowed therethrough into the influent waste stream. By "inert gas", it is mean that a gas or gas mixture is used which could be, for example, nitrogen, which does not adversely react with any of the system components with which it comes in contact. Inert gas at source 110 is fed into the system with valve 111 at any convenient point through inert gas line 112 and preferably near the point at which oxygen enters the multiple-phase composition feed line assembly as shown in FIG. 1. As inert gas is flowed through the injection lines, a stream of fluid water is simultaneously flowed through the injection lines, along with the inert gas. Next, an aqueous, dilute detergent, such as a trisodium phosphate solution or the like, is added to tank 66 which is then introduced into the injection lines while the inert gas flow through the lines is continued. Of course, a non-phosphate detergent may be preferable in some applications. The concentration and composition of the detergent solution is not critical to the practice of this invention and an aqueous solution containing from about 5 to about 10 percent by weight trisodium phosphate is sufficient to clean injection lines. It may be suitable in some applications to start the flow of aqueous detergent solution immediately after the inert gas flow is commenced, eliminating the intermediate water step. The flow rate of each material, i.e. inert gas, detergent solution and such, is not crucial but should be sufficient to expeditiously clean injection lines 80 and 82, particularly of any foreign matter such as combustible waste which may have backflowed from the reactor into the injection lines. The quantity of aqueous detergent solution required will, of course, vary to some extent according to the dimensions of the injection lines. From about 10 to 100 and, preferably, about 55 gallons of dilute aqueous detergent will be sufficient for most applications.

After the requisite amount of aqueous detergent solution has been flowed through the injection lines, liquid water from tank 66 is again flowed through to remove any detergent residue deposited during the prior step. The flow of inert gas through the lines is still maintained. Since the inert gas does not react with the combustible waste in the reactor in an oxidation reaction, the accelerated oxidation reaction is not activated. After the injection lines have been adequately rinsed, gaseous oxygen or an oxygen-rich gas is flowed through the lines. As the oxygen flow is commenced, the nitrogen flow is stopped. The sequence of the commencement of the oxygen flow and the cessation of the nitrogen flow is not critical, but is preferred that the nitrogen flow be cut out as soon as practical after the oxygen flow is cut in. The water flow is still maintained. The water flow and oxygen or oxygen-rich gas are then adjusted to provide the multiple-phase composition described herein at the pressurization necessary for injection into the reaction apparatus.

It is most preferred that the accelerated wet oxidation reaction be shut down in the following manner, which is intended to come within the scope of the present invention. First, the flow of diluted influent waste into the downcomer annulus is discontinued. The effluent stream from which the ash endproduct has been substantially removed by settling or the like is then directed into the influent side of the reaction apparatus in place of the influent waste stream. In those applications where the effluent fluid, with the ash removed, is used as a diluent for diluting the combustible waste, the supply of combustible waste can simply be interrupted, allowing the effluent/diluent to continue to flow through the reaction apparatus. Alternatively, water can be cycled through the reaction apparatus instead of the effluent/diluent. It will be understood that recycling the effluent/diluent or water in the reaction apparatus eliminates one reactant, the organic waste, and hence the oxidation reaction stops. This shut-down sequence additionally ensures that no combustible unprocessed waste is carried through the reaction apparatus during shut-down.

While the effluent/diluent or water flows through the reaction apparatus in place of the waste stream, an inert gas such as nitrogen, as previously described, is flowed through the injection lines along with the multiple-phase composition. The inert gas effectively dilutes the concentration of oxygen. For both the start-up and shut-down sequences of the present invention, the concentration of oxygen in the injection lines, during those periods and in those portions of the lines in which oxygen and inert gas are flowed contemporaneously, should preferably be less than about 90% oxygen by volume. The flow of oxygen is then discontinued, followed by stopping the flow of water. Finally, the flow of inert gas and effluent/diluent are stopped.

Having described the preferred method of the present invention, it will be understood that various modifications may be made to the invention disclosed herein within the purview of the appended claims. As described, the method of injecting oxygen into the downcomer passage of a wet oxidation apparatus is particularly suitable for the deep well wet oxidation apparatus disclosed; however, this method may also be used in other wet oxidation reaction methods and apparatus, reducing the hazards resulting from the use of an oxygen-rich gas and improving the efficiency of the system. Further, the method of this invention is not limited to the wet oxidation of municipal sludge or organic solids, but may also be used in the treatment of various combustible materials, including contaminated or toxic waste in a fluid medium. The method may also be used to treat or convert various combustible materials in a fluid reaction requiring elevated temperatures and pressures. Having described the preferred method of this invention, we now claim the invention as follows.

What is claimed is:

1. A method for introducing gaseous oxygen into a fluid waste stream in conjunction with the accelerated oxidation of organic matter inside a reaction apparatus, comprising the steps of:

preparing a multiple-phase composition which contains gaseous oxygen which is substantially fully saturated with water vapor, said multiple-phase composition also containing liquid water;

injecting said multiple-phase composition into said fluid waste stream in said reaction apparatus at at least one injection site; and, raising the temperature and pressure of said fluid waste stream containing said multiple-phase composition to produce said accelerated oxidation reaction of organic matter, whereby unwanted dry spots which could otherwise form in said reaction apparatus are substantially eliminated.

2. The method recited in claim 1, wherein the quantity of liquid water contained in said multiple-phase composition is at least equal to the quantity of water present in said multiple-phase composition as water vapor.

3. The method recited in claim 1, wherein said multiple-phase composition includes at least 90 percent gaseous oxygen by volume.

4. The method of claim 1, wherein said reaction apparatus is a vertical well wet oxidation reaction apparatus and wherein said multiple-phase composition is injected into said fluid waste stream in said reaction apparatus at multiple injection sites having varying depths in said reaction apparatus.

5. The method of claim 1, wherein said multiple-phase composition is injected into said fluid waste stream in pulses to agitate said organic matter.

6. The method of claim 1, wherein said gaseous oxygen is fully saturated with water vapor at the temperature and pressure of said fluid waste stream in said reaction apparatus at said injection site.

7. The method recited in claim 1, wherein said gaseous oxygen also contains other gases.

8. In a method of effecting an accelerated wet oxidation reaction of combustible material in a fluid stream in a wet aqueous phase oxidation apparatus which includes flowing said fluid stream containing said combustible material through a passage in said wet oxidation apparatus and subjecting said fluid stream containing said combustible material to a selected pressure and temperature to oxidize said combustible material at an accelerated reaction rate the improvement comprising:

injecting a concurrent stream of a gas and liquid water into said fluid stream in said passage, wherein the total volume of water is equal to at least twice the volume of water necessary to saturate said gas with water vapor and wherein said gas is selected from the group consisting of substantially pure oxygen and oxygen-rich gas.

9. The method of effecting accelerated oxidation reaction of a combustible material as defined in claim 8, wherein said stream of said gas and water is injected into said fluid stream at multiple locations along the extent of said passage in said wet oxidation apparatus to control the oxidation reaction.

10. A method of effecting an accelerated wet oxidation reaction of an aqueous stream of combustible waste to form reaction products in a vertical well wet oxidation apparatus of the type having a plurality of generally concentric tubes extending generally vertically to a selected depth below the ground surface, said tubes defining at least a first and second passage, the method comprising the steps of:
   providing a plurality of injection sites in said first passage;
   flowing said aqueous stream of combustible waste into said first passage to form a hydrostatic column having a selected pressure;
   elevating the temperature of said aqueous stream of combustible waste;
   injecting into said aqueous stream of combustible waste in said first passage at said injection sites a pressurized concurrent stream of a gas and liquid water, said gas being selected from the group consisting of substantially pure oxygen and an oxygen-rich gas, and wherein said gas is saturated with water vapor at said pressure of said pressurized concurrent stream and at said temperature of said aqueous stream, and said liquid water is present in an amount which is at least equal to the amount of water present as said water vapor; and,
   flowing said reactant products through said second passage to said ground surface.

11. The method of effecting an accelerated wet oxidation reaction recited in claim 10, wherein said combustible waste is an organic waste and wherein at least one of said injection sites is generally adjacent said ground surface.

12. The method of effecting an accelerated wet oxidation reaction recited in claim 11, wherein the method includes pulsing said concurrent stream of gas and liquid water into said first passage.

13. A method of effecting accelerated oxidation of a combustible aqueous organic waste in a vertical well reactor having a plurality of generally concentric nested tubes defining communicating downcomer and upcomer annuli extending generally vertical to a selected depth below the ground surface, the method comprising flowing an aqueous stream of said combustible organic waste into said downcomer annulus to form a hydrostatic column having a selected pressure, said hydrostatic column having a reaction zone, elevating said temperature of said aqueous stream, introducing a concurrent stream of oxygen-rich gas and liquid water under pressure into said downcomer annulus, the volume of water in said concurrent stream being at least twice the volume necessary to saturate the oxygen-rich gas with water vapor at the temperature and pressure of the fluid column in said downcomer annulus at the point of introduction and maintain water in the liquid phase, said combustible organic waste material reacting with said oxygen forming oxidation reaction products, and returning the oxidation reaction products and water upwardly to the ground surface through said upcomer annulus.

14. The method of effecting accelerated oxidation reaction of an combustible organic waste, recited in claim 13, wherein said concurrent stream of oxygen-rich gas and liquid water is introduced into said downcomer annulus at predetermined vertically spaced locations, including a location adjacent the said reaction zone.

15. The method of effecting accelerated oxidation reaction of an combustible organic waste recited in claim 1, including introducing said concurrent stream of an oxygen-rich gas and water into said downcomer annulus generally adjacent said ground surface and wherein said introduction of said concurrent stream includes pulsing said concurrent stream at predetermined timed intervals to agitate said combustible organic waste to reduce fouling.

16. In a method of producing an accelerated wet oxidation reaction in an aqueous stream containing combustible waste in a reaction apparatus wherein gaseous oxygen or an oxygen-enriched gas is introduced into said aqueous stream containing combustible waste through at least one injection line and wherein said accelerated wet oxidation reaction occurs at a selected elevated temperature and pressure in said reaction apparatus to form an effluent waste stream mixture containing an end-product and a liquid portion, and wherein said end-product is removed from said liquid portion, the improvement comprising the steps of:
   (A) flowing said aqueous stream containing combustible waste into said reactor;
   (B) causing said aqueous stream containing combustible waste to attain said selected elevated temperature and pressure;
   (C) flowing continuously a first stream of inert gas into said aqueous stream containing combustible waste in said reaction apparatus through said injection line;
   (D) flowing continuously a first stream of liquid water through said injection line along with said first stream of inert gas;
   (E) stopping the flow of said first liquid water stream;
   (F) flowing continuously a dilute aqueous detergent solution through said injection line along with said first stream of inert gas into said reaction apparatus to clean said injection line;
   (G) stopping the flow of said dilute aqueous detergent solution;
   (H) flowing continuously a second stream of liquid water through said injection line along with said first stream of inert gas into said reaction apparatus to rinse said injection line;
   (I) flowing through said injection line and into said reaction apparatus a stream of gas containing said gaseous oxygen along with said second stream of liquid water and said first stream of inert gas;
   (J) stopping the flow of said first stream of said inert gas;
   (K) adjusting the flow of said gas containing said oxygen and the flow of said second stream of liquid water to provide a multiplephase composition, wherein said multiple-phase composition includes both said gas containing said oxygen which is saturated with water vapor, and liquid water to prevent the formation of dry spots in said reaction apparatus which would otherwise occur and to control said accelerated wet oxidation reaction.

17. The method recited in claim 16, further comprising the steps of:
(L) stopping the flow of said aqueous stream containing combustible waste into said reaction apparatus which was started in step (A);
(M) flowing said liquid portion of said effluent into said reaction apparatus in place of said aqueous stream containing combustible waste;
(N) flowing a second stream of said inert gas through said injection line and into said reaction apparatus to dilute the concentration of said gas containing oxygen;
(O) stopping the flow of said stream of gas containing oxygen;
(P) stopping the flow of said second stream of liquid waste;
(Q) stopping the flow of said second stream of inert gas;
(R) stopping the flow of said liquid portion of said effluent.

18. The method recited in claim 16, wherein said aqueous detergent solution contains from about 5 percent to about 10 percent by weight trisodium phosphate.

19. The method recited in claim 16, wherein said inert gas is nitrogen.

20. The method recited in claim 16, wherein steps (A) through (K) are performed in sequence.

21. The method recited in claim 17, wherein steps (L) through (R) are performed in sequence.

22. The method recited in claim 17, wherein liquid water is substituted for the liquid portion of said effluent in step (M).

23. A method for producing a controlled, accelerated oxidation reaction of organic matter in an aqueous stream inside a downcomer passage of a vertical tube reaction apparatus comprising the steps of preparing a multiple-phase composition containing both an oxygen-rich gas which is fully saturated with water vapor and which also contains liquid water, pulsing said multiple-phase composition through at least one injection site into said aqueous stream of organic matter near the top of said downcomer passage to churn said aqueous stream of organic matter to prevent fouling of said downcomer passage and to reduce pumping pressure, raising the temperature and pressure of said aqueous stream of organic matter to produce said controlled accelerated oxidation reaction.

24. In a method of producing an accelerated wet oxidation reaction in an aqueous stream containing combustible waste in a reaction apparatus wherein gaseous oxygen or an oxygen-enriched gas is introduced into said aqueous stream containing combustible waste through at least one injection line and wherein said accelerated wet oxidation reaction occurs at a selected elevated temperature and pressure in said reaction apparatus to form an effluent waste stream mixture containing an end-product and a liquid portion, and wherein said end-product is removed from said liquid portion, the improvement comprising the steps of:
(A) flowing said aqueous stream containing combustible waste into said reactor;
(B) causing said aqueous stream containing combustible waste to attain said selected elevated temperature and pressure;
(C) flowing continuously a first stream of inert gas into said aqueous stream containing combustible waste in said reaction apparatus through said injection line;
(D) flowing continuously a dilute aqueous detergent solution through said injection line along with said first stream of inert gas into said reaction apparatus to clean said injection line;
(E) stopping the flow of said dilute aqueous detergent solution;
(F) flowing continuously a second stream of liquid water through said injection line along with said first stream of inert gas into said reaction apparatus to rinse said injection line;
(G) flowing through said injection line and into said reaction apparatus a stream of gas containing said gaseous oxygen along with said second stream of liquid water and said first stream of inert gas;
(H) stopping the flow of said first stream of said inert gas;
(I) adjusting the flow of said gas containing said oxygen and the flow of said second stream of liquid water to provide a multiple-phase composition, wherein said multiple-phase composition includes both said gas containing said oxygen which is saturated with water vapor, and liquid water to prevent the formation of dry spots in said reaction apparatus which would otherwise occur and to control said accelerated wet oxidation reaction.

* * * * *